(No Model.)
F. J. MERZ.
MILK COOLER.
No. 503,868. Patented Aug. 22, 1893.
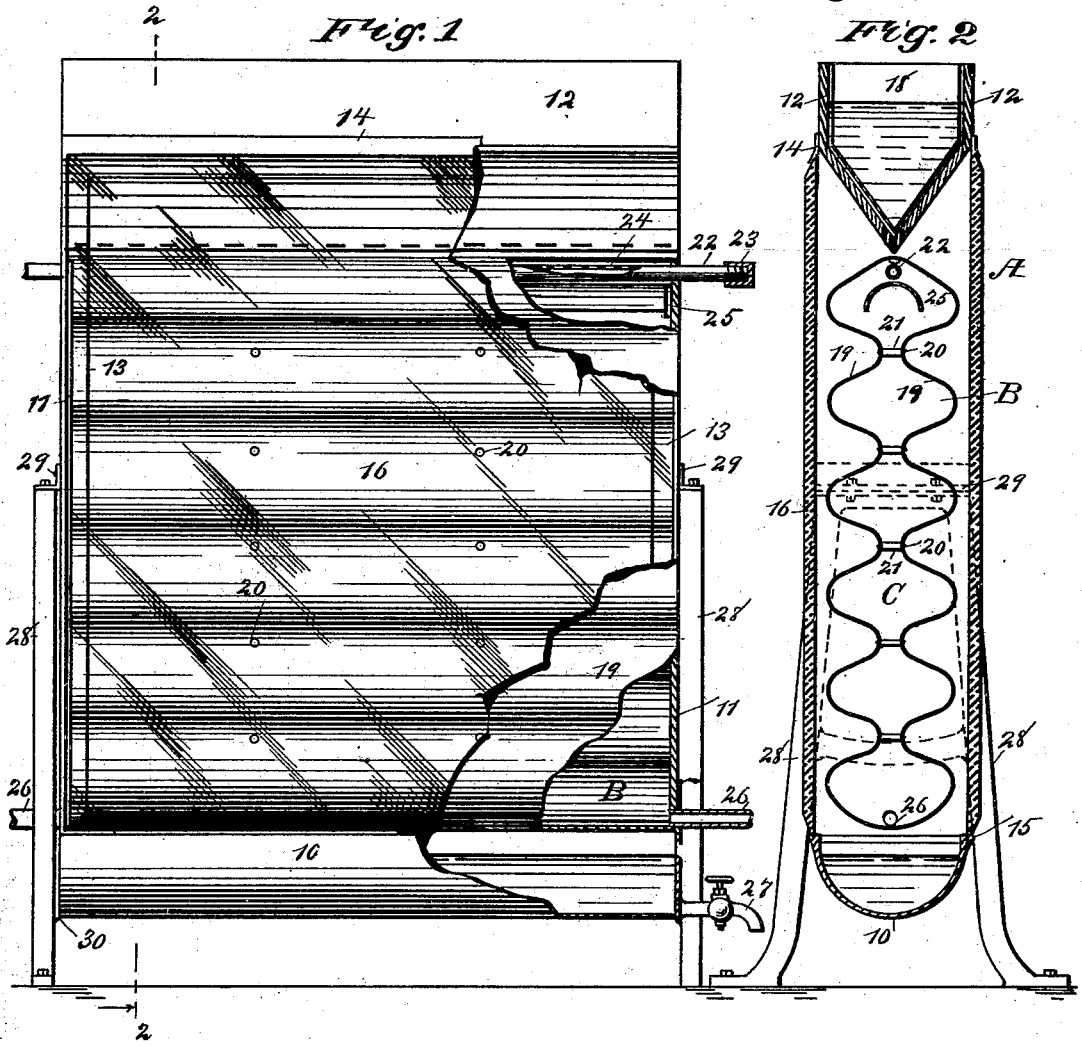
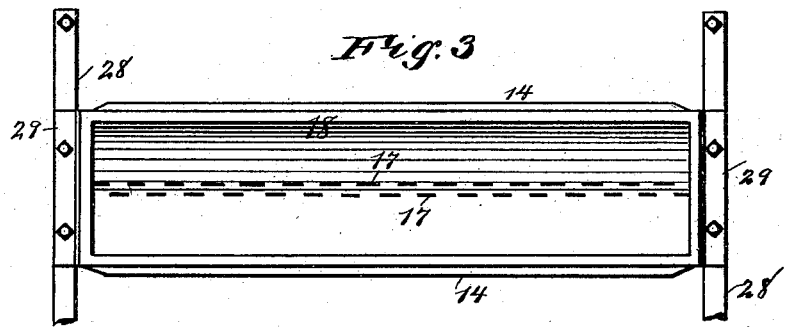
WITNESSES:
J. A. Bergham
C. Sedgwick
INVENTOR
F. J. Merz
BY Munn & Co.
ATTORNEYS.

UNITED STATES PATENT OFFICE.

FRANK J. MERZ, OF SEATTLE, WASHINGTON.

MILK-COOLER.

SPECIFICATION forming part of Letters Patent No. 503,868, dated August 22, 1893.

Application filed December 14, 1892. Serial No. 455,124. (No model.)

*To all whom it may concern:*

Be it known that I, FRANK J. MERZ, of Seattle, in the county of King and State of Washington, have invented a new and Improved Milk-Cooler, of which the following is a full, clear, and exact description.

My invention relates to an improvement in milk coolers, and it has for its object to provide a cooler of simple, durable and economic construction, wherein the milk will be rendered cool in an expeditious and thoroughly effective manner, the milk being passed over one side of a wall in a continuous sheet, while the opposite side of the wall is kept constantly cool by a continuously formed and continuously flowing sheet of water.

The invention consists in the novel construction and combination of the several parts, as will be hereinafter fully set forth and pointed out in the claims.

Reference is to be had to the accompanying drawings forming a part of this specification, in which similar figures and letters of reference indicate corresponding parts in all the views.

Figure 1 is a side elevation of the milk cooler, portions thereof being broken away to disclose the interior. Fig. 2 is a vertical section taken essentially on the line 2—2 of Fig. 1; and Fig. 3 is a plan view, the strainer being removed from the hopper of the machine.

In carrying out the invention a trough 10 of any desired depth and preferably semi-circular in cross section, is made to compose the bottom portion of the frame; and the frame in addition to the trough consists of end plates 11, which extend downward and over the ends of the trough, and the upper portions of the plates are attached to the ends of the hopper 12, the lower portion of which hopper is angular or V-shaped in cross section, as shown in Fig. 2, the point or angle of the hopper being immediately over the central portion of the trough 10, but removed some distance therefrom. The frame is completed by forming upon the sides of the end plates 11 inwardly-extending flanges 13, and the side flanges are continued over at the top of the frame to form an upper flange 14, the upper flange being continuous with the side flanges; and a lower socket 15, is produced preferably in the upper side edges of the trough 10. The flanges and sockets in the trough are adapted to receive plates 16, preferably of glass or of a transparent material, and the glass is employed in order to close in the side portions of the frame, and prevent dust or foreign matter from entering the chamber A, produced by the above described formation of the frame.

The trough 10 constitutes the bottom of this chamber, and the angular portion of the hopper 12, forms its top, while the plates 13 of the frame constitute the ends of the chamber, and the glass plates 16 its sides. The trough 12, as is shown in plan view in Fig. 3, is provided with longitudinal series of openings 17, and these openings are preferably arranged in two series, one located at each side of the point or depression in the bottom of the hopper. Within the hopper a sieve or strainer 18, is located, entirely covering its sides and bottom, as the milk to be treated is first placed in this hopper, and it is desired that before it leaves the hopper the milk shall be clear from all foreign matter.

The cooling of the milk takes place within the chamber A, and the apparatus through the medium of which the cooling is produced is designated as B, and is constructed in the following manner: Two opposed serpentine walls 19, are formed by attaching the ends of fluted or corrugated plates of metal at their ends to the end plates of the frame. The sheets of metal constituting the fluted or serpentine walls 19, are connected at top and bottom, forming an inner chamber or compartment C, and the upper and lower ends of this compartment or chamber are preferably rounded or cylindrical in general contour. The metal plates constituting the walls 19, are so placed that the corrugations in one plate will exactly face the corrugations in the opposite plate. Thus the chamber C, surrounded by the walls 19, may be said to consist of a number of connected essentially oval compartments. The walls are strengthened and held in proper place by bolts 20, which are passed through the narrowest portions of the chamber at suitable intervals apart, the bolts being preferably passed through spacing thimbles 21. A water inlet pipe 22, is passed through the top of the serpentine chamber and through the side walls of the frame, extending some distance beyond the latter.

One end of the inlet pipe is adapted to be closed by a cap 23, and the other end of the pipe is to be coupled in any approved manner with a water service pipe for example, the service pipe being preferably of greater diameter than the inlet or supply pipe 22. The inlet pipe 22 is provided with a number of openings 24, arranged in longitudinal series, the series of openings being produced in the top and side portions of the pipe; and immediately below the inlet or supply pipe a curved baffle plate or fender 25, is located in the serpentine compartment, the convexed side of the fender being faced upward. The fender is centrally located in the upper compartment of the chamber C, and extends from end to end thereof.

In the lowermost compartment of the chamber C outlet pipes 26, are introduced preferably into each end, one of them being ordinarily capped; and both the outlet pipes and the supply pipe 24, extend beyond both sides of the frame, in order that the machine may be placed wherever it is most convenient and couplings be effected at either end of the frame.

The trough 10 is preferably provided at both ends with faucets 27, only one however being shown adapted for use in drawing off the cooled milk.

The frame and the parts carried thereby are held at an elevation from the ground or floor or other support upon which they are to be placed, which result is accomplished through the medium of legs 28. The legs are arranged in two sets, each set being preferably made in one casting, and the legs are of less length than the height of the body of the casing; the upper portions of the legs are attached to the end plates 11 of the frame, ordinarily by means of brackets 29, secured to said end plates and to the tops of the legs, as shown in Figs. 1 and 2. Preferably at the lower portion of each set of legs, upon their inner faces, a semi-circular flange 30, is produced, adapted to receive the ends of the trough 10, and assist in supporting it, the flanges 30, being given a contour corresponding to the cross sectional contour of the trough.

The operation of the cooler is as follows: The water is turned on in the service pipe and it thereupon flows into the distributing pipe 22 and is forced outward through its apertures; it then strikes the slanting top of the chamber C, and as the water strikes the top of the chamber at each side of its center it will flow along the inner face of the serpentine walls in a sheet until it reaches the bottom where the two sheets of water will commingle and pass out through whatever offtake 26 is employed. The baffle plate 25 prevents the water from dropping down vertically and compels it, when leaving the distributing pipe, to pass over the serpentine walls of the chamber. The milk is placed in the hopper 18, and finds its escape from the hopper through the opening 17 in its bottom, and it strikes the outer face of the walls 19 of the chamber C and flows down the outer face of each side wall of that chamber in a continuous sheet, and is finally delivered to the trough 10 upon reaching the bottom of the walls. It will be understood that both the water and the milk will follow the convolutions, or the shape of the walls of the chamber C, clinging to the walls, and as the supply of water is continuous and constantly changing, the walls of the chamber are cooled and kept cool, and the milk is cooled in an effectual and expeditious manner by contacting with the cool walls 19 throughout their length.

Having thus described my invention, I claim as new and desire to secure by Letters Patent—

1. A cooler comprising the vertical end pieces, the vertical chamber B, secured between said end pieces and formed of corrugated plates secured together, a perforated pipe 22, extending across the said chamber within its upper end, a baffle plate 25 beneath the pipe to direct the descending cooling liquid against the opposite walls of said chamber, an outlet in the bottom of the chamber, a hopper 12 secured between the upper ends of said side walls and having two series of outlets in its bottom to direct the liquid to be cooled upon the opposite outer walls of said cooling chamber and a trough under the cooling chamber to receive the cooled liquid, substantially as set forth.

2. A cooler comprising the vertical end pieces 11, having flanges 13, on their adjacent faces and a flange 14 connecting the two end pieces, a hopper 12 between the upper ends of the side pieces and having a V-shape bottom provided with two sets of perforations 17, the serpentine cooling chamber having a supply and outlet for the cooling liquid, the trough 10 below the said chamber and the glass panels 16 secured by the flanges 13, 14 and resting at their lower edges on the longitudinal edges of the trough, substantially as set forth.

FRANK J. MERZ.

Witnesses:
FREDERICK CAPPEL,
HENRY STIMAN.